United States Patent
Bouesnard et al.

(10) Patent No.: US 9,896,880 B2
(45) Date of Patent: *Feb. 20, 2018

(54) GLAZING PANEL COMPRISING GLASS SHEETS LINKED TOGETHER VIA SPACERS AND CORRESPONDING PRODUCTION METHOD

(71) Applicant: AGC GLASS EUROPE, Louvain-la-Neuve (BE)

(72) Inventors: Olivier Bouesnard, Ittre (BE); Francois Closset, Spa (BE); Priscille Dreux, Saint Saulve (FR)

(73) Assignee: AGC GLASS EUROPE, Louvain-La-Neuve (BE)

( * ) Notice: Subject to any disclaimer, the term of this patent is extended or adjusted under 35 U.S.C. 154(b) by 310 days.

This patent is subject to a terminal disclaimer.

(21) Appl. No.: 14/403,755

(22) PCT Filed: May 24, 2013

(86) PCT No.: PCT/EP2013/060779
§ 371 (c)(1),
(2) Date: Nov. 25, 2014

(87) PCT Pub. No.: WO2013/174994
PCT Pub. Date: Nov. 28, 2013

(65) Prior Publication Data
US 2015/0140258 A1 May 21, 2015

(30) Foreign Application Priority Data

May 25, 2012 (BE) .................................. 2012/0357

(51) Int. Cl.
*E06B 3/677* (2006.01)
*E06B 3/66* (2006.01)
*E06B 3/663* (2006.01)

(52) U.S. Cl.
CPC .......... *E06B 3/6775* (2013.01); *E06B 3/6612* (2013.01); *E06B 3/66371* (2013.01);
(Continued)

(58) Field of Classification Search
CPC .. E06B 3/6775; E06B 3/66371; E06B 3/6612; E06B 3/66314; E06B 3/66357; E06B 3/66361; Y02B 80/22; Y02B 80/24
See application file for complete search history.

(56) References Cited

U.S. PATENT DOCUMENTS 1,448,351 A 3/1923 Kirlin
3,629,980 A * 12/1971 Hordis .................... E06B 3/677
137/251.1
(Continued)

FOREIGN PATENT DOCUMENTS

| EP | 0 421 239 | 4/1991 |
|---|---|---|
| JP | 2001-206740 A | 7/2001 |
| JP | 2004-149343 A | 5/2004 |
| JP | 2005-231939 A | 9/2005 |
| WO | 94 24398 | 10/1994 |
| WO | 01 34932 | 5/2001 |
| WO | WO 2011/061208 | * 5/2011 |

OTHER PUBLICATIONS

Machine translation of already cited JP 2005-231939.*
International Search Report dated Aug. 7, 2013 in PCT/EP13/060779 Filed May 24, 2013.

*Primary Examiner* — Donald J Loney
(74) *Attorney, Agent, or Firm* — Oblon, McClelland, Maier & Neustadt, L.L.P.

(57) ABSTRACT

The invention concerns a glazing panel comprising first (5) and second (5) glass sheets linked together via at least one spacer (8) which holds them a certain distance apart from one another and, between said glass sheets (5), an inner space (4) comprising at least one first cavity (41), in which there is a vacuum of less than 100 mbar and which is closed by a peripheral seal disposed at the periphery of the glass sheets, around said inner space (4), the seal (1) being a metal seal rigidly connected respectively to the first and second glass sheets. According to the invention, the metal seal (1) further comprises at least one hollow metal tube (11) of which a first end (111) communicates with the inner space (4) and a second end (112) communicates with the outside of the panel, the second end (112) comprising means for blocking the tube. According to the invention, the tube comprises at least one gas trap (113) rigidly connected to the inside of the tube (11).

19 Claims, 3 Drawing Sheets

(52) U.S. Cl.
CPC ....... *E06B 3/66314* (2013.01); *E06B 3/66357* (2013.01); *E06B 3/66361* (2013.01); *Y02B 80/24* (2013.01); *Y10T 428/231* (2015.01)

(56) References Cited

U.S. PATENT DOCUMENTS

| | | | | |
|---|---|---|---|---|
| 4,592,179 | A | * | 6/1986 | Boutarin ................. E06B 3/677 |
| | | | | 156/109 |
| 4,683,154 | A | * | 7/1987 | Benson ................. C03B 23/245 |
| | | | | 156/107 |
| 5,009,218 | A | * | 4/1991 | Bachli ..................... C03C 17/09 |
| | | | | 126/649 |
| 5,124,185 | A | | 6/1992 | Kerr et al. |
| 5,270,084 | A | * | 12/1993 | Parker ..................... C03C 27/06 |
| | | | | 156/109 |
| 5,657,607 | A | | 8/1997 | Collins et al. |
| 6,383,580 | B1 | | 5/2002 | Aggas |
| 6,420,002 | B1 | * | 7/2002 | Aggas ................... E06B 3/6612 |
| | | | | 156/109 |
| 9,624,715 | B2 | * | 4/2017 | Dreux ................... E06B 3/6775 |
| 2012/0222373 | A1 | | 9/2012 | Bouesnard et al. |

\* cited by examiner

GLAZING PANEL COMPRISING GLASS SHEETS LINKED TOGETHER VIA SPACERS AND CORRESPONDING PRODUCTION METHOD

1. FIELD OF THE INVENTION

The field of the invention is that of glazing panels comprising glass sheets bounding at least one internal space in which a partial vacuum has been generated, also referred to as vacuum-insulated glazing panels.

The invention more particularly relates to the generation of the vacuum in such panels.

These panels may be used in any type of application such as in general-purpose glazing units (in furniture, partitions, etc.), automotive glazing units or architectural glazing units.

2. PRIOR-ART SOLUTIONS

A vacuum-insulated glazing panel is typically composed of at least two glass sheets separated by an internal space in which a partial vacuum has been generated. Such a glazing unit is conventionally used for its high thermal insulation properties, due to the partial vacuum. The thickness of the space under vacuum is typically from 80 µm to 800 µm.

In order to achieve a high-performance insulation (transmission coefficient per unit area U<0.6 W/m²K) the pressure inside the glazing unit must be about $10^{-3}$ mbar or less and generally at least one of the two glass sheets is covered with a low-E layer having an emissivity ideally lower than 0.05. In order to obtain such a pressure inside the glazing unit, an impermeable seal is placed on the periphery of the two glass sheets and the vacuum is generated inside the glazing unit by virtue of a pump. In order to prevent the glazing unit from caving in under atmospheric pressure (due to the pressure difference between the interior and exterior of the glazing unit), spacers are placed regularly (for example in the form of a grid) between the two glass sheets.

The spacers are generally cylindrical or spherical, the term "pillars" then being used. At the present time, the spacers are generally made of metal and therefore create thermal leaks in the glazing panel. In order to keep the thermal transmission coefficient U below 0.6 W/m²K, the total area of the spacers making contact with the glass must represent less than 1% of the area of the vacuum-insulated glazing panel.

Various impermeable seal technologies exist, each having certain drawbacks. A first type of seal (the most widespread) is a seal based on a solder glass the melting point of which is lower than that of the glass of the glass panels of the glazing unit. The use of this type of seal limits the choice of low-E layers to those that are not degraded by the thermal cycle required to implement the solder glass, i.e. to those that are able to withstand a temperature possibly as high as 350° C. In addition, since this type of solder-glass-based seal is only very slightly deformable, it does not allow the effects of differential expansion between the interior-side glass panel of the glazing unit and the exterior-side glass panel of the glazing unit when said panels are subjected to large temperature differences (for example 40° C.) to be absorbed. Quite substantial stresses are therefore generated at the periphery of the glazing unit and may lead to breakage of the glass panels of the glazing unit.

A second type of seal comprises a metal seal, for example a metal strip of a small thickness (<500 µm) soldered to the periphery of the glazing unit by way of a tie underlayer covered at least partially with a layer of a solderable material such as a soft tin-alloy solder. One substantial advantage of this second type of seal relative to the first type of seal is that it is able to deform in order to absorb the differential expansion created between the two glass panels. There are various types of tie underlayers on the glass panel.

Patent application WO 2011/061208 A1 describes one example embodiment of a peripheral impermeable seal of the second type for a vacuum-insulated glazing unit. In this embodiment, the seal is a metal strip, for example made of copper, that is soldered by means of a solderable material to an adhesion band provided on the periphery of the glass sheets.

As regards the generation of the vacuum in the internal space of the glazing panel, a hollow glass tube bringing the internal space into communication with the exterior is generally provided on the main face of one of the glass sheets. Thus, the partial vacuum is generated in the internal space by pumping out gases present in the internal space by virtue of a pump connected to the exterior end of the glass tube. Patent application EP 1 506 945 A1 describes the use of such a glass tube, which is set and soldered in a through-hole provided in the main face of one of the glass sheets.

However, producing a hole in the main face of one of the glass sheets, in order to make it possible subsequently to insert therein the glass tube, generates substantial stresses around the hole in the glass sheet, which increase the fragility of the latter.

Moreover, the glass tube forms a weak point in the vacuum-insulated glazing panel and therefore must be protected from shocks.

Furthermore, the glass tube protrudes from the surface of one of the glass sheets, which is unattractive and must therefore be hidden.

In order to maintain for the duration a given vacuum level in a vacuum-insulated glazing panel, a getter may be used in the glazing panel. Specifically, the internal surfaces of the glass sheets making up the glazing panel may release over time gases absorbed beforehand in the glass, thereby increasing the internal pressure in the vacuum-insulated glazing panel and thus decreasing the vacuum performance.

Generally, such a getter consists of alloys of zirconium, vanadium, iron, cobalt, aluminum, etc., and is deposited in the form of a thin layer (a few microns in thickness) or in the form of a block placed between the glass sheets of the glazing panel so as not to be seen (for example hidden by an exterior enamel or by a portion of the peripheral impermeable seal).

The getter forms, on its surface, a passivation layer at room temperature, and must therefore be heated in order to make the passivation layer disappear and thus activate its alloy gettering properties. The getter is said to be "heat activated". Generally, the alloys of getters are activated by heating them to about 250° C. for 1 hour.

Thus, heating the alloy of the getter runs the risk of degrading the properties of the glass sheets and their possible functional layers (such as thermally insulating layers) and of degrading the integrity of the peripheral seal.

3. OBJECTIVES OF THE INVENTION

The objective of the invention is especially to mitigate these drawbacks of the prior art.

More precisely, one objective of the invention, in at least one of its embodiments, is to provide a technique allowing a partial vacuum to be generated in the internal space of a vacuum-insulated glazing panel that generates fewer stresses in the glass sheets of the panel than conventional techniques.

Another objective of the invention, in at least one of its embodiments, is to provide such a technique that allows the vacuum in the glazing unit to be perpetuated without however impairing the glass sheets and/or their possible functional layers (such as thermally insulating layers) and/or the peripheral seal.

Another objective of the invention, in at least one of its embodiments, is to provide such a technique that allows the vacuum in the glazing unit to be perpetuated without however encumbering the space between the two glass sheets.

Another objective of the invention, in at least one of its embodiments, is to provide such a technique that allows the vacuum in the glazing unit to be perpetuated without however impairing the appearance of the glazing unit.

Another objective of the invention, in at least one of its embodiments, is to provide such a technique that increases less the fragility of the vacuum-insulated glazing panel.

Another objective of the invention, in at least one of its embodiments, is to provide such a technique that degrades the appearance of the panel less than conventional techniques.

Another objective of the invention, in at least one of its embodiments, is to provide such a technique that is easy to implement.

Yet another objective of the invention, in at least one of its embodiments, is to provide such a technique that is inexpensive.

4. SUMMARY OF THE INVENTION

According to one particular embodiment, the invention relates to a glazing panel comprising a first glass sheet and a second glass sheet that are associated together by way of at least one spacer that holds said sheets a certain distance apart, and, between said glass sheets, an internal space comprising at least one first cavity, in which cavity there is a vacuum with a pressure of less than 100 mbar, said space being closed with a peripheral impermeable seal placed on the periphery of the glass sheets around said internal space, the impermeable seal being a metal seal securely fastened to the first and second glass sheets, respectively.

According to the invention, the metal seal furthermore comprises at least one hollow metal tube, a first end of which communicates with the internal space and a second end of which communicates with the exterior of the panel, the second end comprising means for blocking the tube.

According to the invention, the tube comprises at least one getter securely fastened to the interior of the tube.

Of course, in all of the following, the tube may have a cross section that is circular, square, triangular or even any other shape. It may also have a constant cross section over its entire length or a cross section that varies over its length. Over its length, the cross section of the tube may change geometry, for example the cross section may change from square to circular over the length of the tube.

Of course, in all the following, the roles of the first and second glass sheets are interchangeable.

Of course, the term "glass" is understood to mean any type of glass or equivalent transparent material, such as a mineral glass or an organic glass. The mineral glasses used may be irrespectively one or more known types of glass such as soda-lime glasses, borate glasses, crystalline and polycrystalline glasses. The organic glass used may be a polymer or a rigid thermoplastic or thermosetting transparent polymer or copolymer such as, for example, a transparent synthetic polycarbonate, polyester or polyvinyl resin.

Thus, the blockable means for bringing the internal space into communication with the exterior of the panel allow the partial vacuum to be generated in the internal space without it being necessary to employ the glass tube conventionally provided in a hole produced in the main face of one of the glass sheets. Thus, this technique generates fewer stresses in the glass sheets of the panel than conventional techniques.

Moreover, because a glass tube that protrudes from one of the glass sheets is not required, this technique increases less the fragility of the vacuum-insulated glazing panel and degrades less the appearance of the panel.

Thus also, the fact that the tube comprises the getter within it allows the getter to be activated by localized heating of the portion of the tube comprising the getter, without this heating impairing the glass sheets and/or their possible functional layers (such as thermally insulating layers) and/or the peripheral seal.

Advantageously, the getter comprises a coating placed on at least one portion of the internal surface of the tube.

According to one advantageous feature of the invention, the getter comprises a tubular part provided to be inserted into the tube.

Advantageously, the getter comprises an alloy of at least one of the following materials:
  zirconium;
  titanium;
  vanadium;
  iron;
  the alkali metals (for example at least one of lithium, sodium, potassium, rubidium, cesium and francium); and
  the alkaline-earth metals (for example at least one of magnesium, calcium, beryllium, strontium, barium and radium).

Advantageously, the getter comprises an alloy of the following materials:
  zirconium;
  vanadium; and
  iron.

According to one advantageous feature of the invention, the means for blocking the tube comprise a plug formed by pinching off the second end of the tube.

Specifically, those internal surface portions of the tube which are brought into physical contact by the pinching off bond together atomically, this bonding occurring between atoms in their surface layers, thus producing a cold weld that is very strong and that does not require heat and solder to be used. Of course, according to the invention, any other blocking technique and any other type of plug may be used, for example a metal plug that is screwed, force fitted or soldered to one end of the tube.

Advantageously, the metal seal comprises at least one material selected from copper and its alloys, aluminum and its alloys and nickel and its alloys, in an unoxidized state.

Advantageously, the metal tube comprises at least one material selected from copper and its alloys, aluminum and its alloys and nickel and its alloys, in an unoxidized state.

Specifically, thus, since the internal surface portions of the tube that are brought into physical contact by the pinching off are not oxidized, a larger number of atomic bonds is generated, thereby increasing the strength of the cold weld.

Advantageously, the internal surface of the tube is cleaned beforehand (ultrasonically) in order to remove contaminants from the surface (which would prevent bonds from being created and therefore decrease the strength of the weld). For example, the internal surface is polished with a 320-grit emery cloth in order to remove possible oxide crystals.

According to one advantageous feature of the invention, the internal space of the panel also comprises a second cavity placed between the metal seal and the edge face of the panel, the second cavity being closed by the metal seal.

Advantageously, the first end of the metal tube is contained in the second cavity.

Specifically, in the case where the spacing between the two glass sheets is smaller than the outside diameter of the metal tube, the first end of the metal tube cannot be inserted into the first cavity of the internal space between the glass sheets but may thus be inserted into the second cavity of the internal space between the metal seal and the edge face of the panel.

Advantageously, the metal seal is securely fastened by soldering to a first peripheral zone of the first glass sheet covered with a first adhesion coating and to a second peripheral zone of the second glass sheet covered with a second adhesion coating.

According to one advantageous feature of the invention, the metal seal comprises a metal strip drilled with a hole into which the metal tube is placed.

Advantageously, the metal tube is securely fastened to the metal strip by soldering.

The invention also relates to a process for manufacturing a vacuum-insulated glazing panel, comprising the following steps:
  associating together a first glass sheet and a second glass sheet by way of at least one spacer that holds said sheets a certain distance apart, between said glass sheets, an internal space forms a first cavity;
  closing the internal space with a peripheral impermeable seal placed on the periphery of the glass sheets, around said internal space, the impermeable seal being a metal seal securely fastened to the first and second glass sheets, respectively; and
  pumping down the internal space in order to obtain a vacuum with a pressure of less than 100 mbar.

According to the invention, the metal seal furthermore comprises at least one hollow metal tube, a first end of which communicates with the internal space and a second end of which communicates with the exterior of the panel.

According to the invention, the process furthermore comprises the following step:
  securely fastening at least one getter to the interior of the tube.

Advantageously, the process comprises a step of coating at least one portion of the internal surface of the tube with the getter.

Advantageously, the process comprises a step of inserting the getter into the tube.

Advantageously, the process furthermore comprises the following step:
  blocking the second end of the tube once the pumping step has terminated.

According to one advantageous feature of the invention, the blocking step consists of pinching off the second end of the tube.

Advantageously, the metal seal is securely fastened by soldering to a first peripheral zone of the first glass sheet covered with a first adhesion coating and to a second peripheral zone of the second glass sheet covered with a second adhesion coating.

Advantageously, the metal seal comprises a metal strip and the process comprises a step of drilling the strip in order to produce a hole and a step of inserting the metal tube into the hole.

According to one advantageous feature of the invention, the metal tube is securely fastened to the metal strip by soldering.

5. LIST OF FIGURES

Other features and advantages of the invention will become more clearly apparent on reading the following description of a preferred embodiment, given simply by way of nonlimiting illustrative example, and from the appended drawings, in which.

6. DESCRIPTION OF ONE EMBODIMENT OF THE INVENTION

The present invention will be described with reference to particular embodiments and with reference to certain drawings; however, the invention is not limited thereby and is limited only by the claims. In the drawings, the size and relative dimensions of certain elements may have been exaggerated and not drawn to scale for the sake of illustration.

In addition, the terms "first", "second", "third", etc., in the description and in the claims are used to distinguish between similar elements and not necessarily to describe a sequence whether it be temporal, spatial, for the sake of classification or otherwise. Of course the terms thus used are interchangeable in appropriate circumstances and the embodiments of the invention described here are capable of using other sequences than those described or illustrated here.

In addition, the terms "high", "low", "above", "below", etc., in the description and claims are used for descriptive purposes and not necessarily to describe relative positions. Of course the terms thus used are interchangeable in appropriate circumstances and the embodiments of the invention described here are capable of being used in other orientations than those described or illustrated here.

It will be noted that the term "comprising", used in the claims, must not be interpreted as being restricted to the means listed thereafter; it does not exclude other elements or steps. It must therefore be interpreted as specifying the presence of the specified elements, units, steps or components referenced, but not excluding the presence or addition of an element, unit, step or component, or group thereof. Therefore the scope of the expression "an apparatus comprising the means A and B" must not be limited to apparatuses consisting only of components A and B. In other words, as regards the present invention, the only relevant components of the apparatus are the components A and B.

Such as used here and unless otherwise indicated, the term "impermeable" is understood to mean impermeable to air or any other gas present in the atmosphere.

Such as used here and unless otherwise indicated, the expression "thermally insulating layer" is understood to mean a layer of metal oxide having an emissivity lower than 0.2, preferably lower than 0.1 and more preferably lower than 0.05. A thermally insulating layer may for example be one of the following layers: Planibel G, Planibel Top N, Top N+ and Top 1.0 sold by AGC.

Such as used here and unless otherwise indicated, the term "spacer" relates to the one or more elements ensuring a relatively constant distance is maintained between two adjacent glass sheets.

Below, the particular case where a glazing panel according to the invention is a vacuum-insulated glazing panel is considered. Of course, the invention also applies to any type of glazing panel comprising glass sheets (two, three or more) bounding insulating or non-insulating internal spaces (also called multiple glazing panels) provided that a partial vacuum is generated in at least one of these internal spaces.

For example, the invention also applies to a triple glazing panel, a first internal space of which comprises a partial vacuum and a second internal space of which is filled with gas, for example, but not exclusively, dry air, argon (Ar), krypton (Kr), xenon (Xe), sulfur hexafluoride ($SF_6$) or even a mixture of certain of these gases.

Of course, other variants are envisionable and in particular one of the glass sheets of the panel may be replaced by a laminated glass panel and any other addition or modification may be made.

Figure 1:
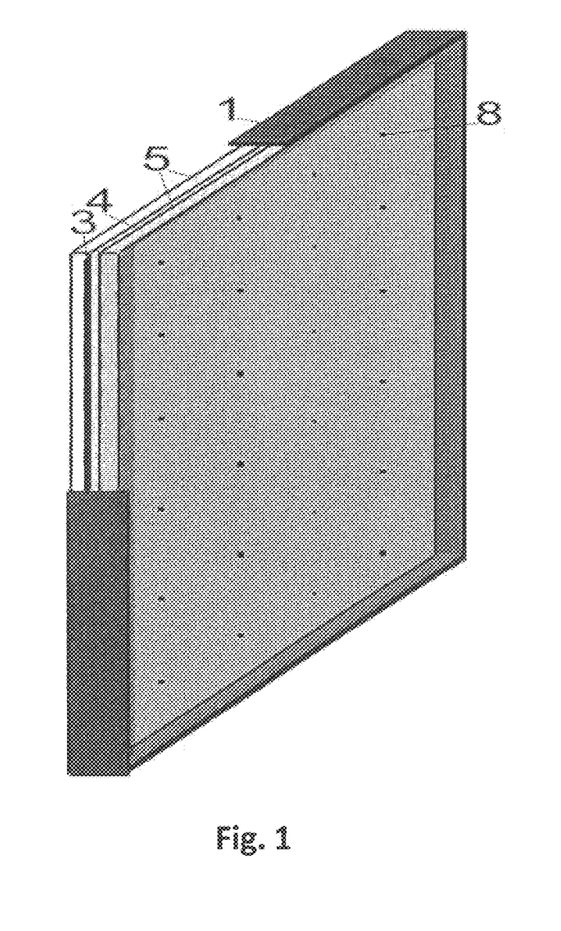
FIG. 1 shows a schematic of a vacuum-insulated glazing panel according to one embodiment of the invention.

FIG. 1 shows a view of an entire vacuum-insulated glazing panel according to one embodiment of the invention.

The vacuum-insulated glazing panel comprises first and second glass sheets 5 (for example clear soda-lime-silica glass sheets 6 mm in thickness) that are associated together by way of at least one spacer 8 that keeps them a certain distance apart. Thus, the first and second glass sheets 5 are separated by a first internal space 4 comprising a first cavity 41. In the internal space 4 there is a vacuum with a pressure of less than 100 mbar, for example of less than 1 mbar, for example equal to $10^{-3}$ mbar (obtained by pumping the internal space 4 using a vacuum pump).

For example, the internal space is about 1 mm in thickness (of course, the internal space may be any other thickness).

In order to facilitate the pumping, the surfaces of the internal space may be degassed beforehand for example by applying a flow of ozone at above 100° C. to the surfaces of the internal space.

Of course, any other type of glass and thickness of glass may be employed according to the invention.

The vacuum-insulated glazing panel also comprises a plurality of spacers 8 according to the invention, the spacers being sandwiched between the first and second glass sheets 5 so as to maintain the first space between these glass sheets 5.

For example, the spacers are placed between the first and second glass sheets so as to form a grid the pitch of which is comprised between 20 and 80 mm and preferably comprised between 30 and 60 mm.

The spacers 8 may be different shapes, such as cylindrical, spherical, filiform, hour-glass shaped, cruciform, etc.

Below, the context of an example according to the invention in which the spacers 8 are made of AISI301 steel and have a C shape is considered.

The step of forming the austenitic steel first comprises a step of obtaining a wire of cylindrical cross section by drawing. Of course, the step of obtaining the wire may also be obtained by hot extrusion of said AISI301 steel then drawing, allowing the final diameter of the wire to be achieved.

For example, starting with a wire of 5 mm diameter that is then drawn, a thin wire having a diameter of 1 mm (which represents a reduction in the cross section of the wire of 80%) is obtained.

The step of forming the austenitic steel then comprises a step of cutting (for example by means of a wire cutter) at least one portion of the wire in order to form said spacer. For example, the length of said wire portion is 4 mm.

According to one advantageous embodiment, the step of forming the austenitic steel then comprises a step of bending at least one portion of said wire portion so as to form a loop portion the maximum radius of curvature of which is 0.5 mm.

Of course, the bending step may be carried out before the cutting step.

Preferably, the wire portion is a circular portion the radius of curvature of which is 0.5 mm.

Thus, in the context of this second example, the work-hardening step is merged with the drawing step.

Thus, during the drawing operation, the cross section of the wire is decreased by 80% and the strength of the AISI stainless steel is increased from 620 MPa to about 1400 MPa.

For example, if spacers made of non-work-hardened AISI (which therefore have a compressive strength of 620 MPa) that have a contact area equivalent to a disk of 250 µm radius are used, spaced apart from one another by 30 mm, the value of the U coefficient of the vacuum-insulating glazing panel obtained is equal to 0.8 $W/m^2K$.

In contrast, using the aforementioned spacers according to the invention (made of work-hardened AISI 301 and shaped into a C) having a compressive strength of 1400 MPa, the number of spacers may be decreased by separating them by 50 mm while simultaneously improving the U value which is then about 0.5 $W/m^2K$.

U values are estimated for the vacuum-insulated glazing units based on a glazing unit such as described above, comprising a low-E layer. The thermal transmissions (U values) were evaluated using the method described in the publication of the University of Sydney: DETERMINATION OF THE OVERALL HEAT TRANSMISSION COEFFICIENT (U-VALUE) OF VACUUM GLAZING, T M. Simko, A H. Elmandy and R E. Collins. ASHRAE Transactions, 105, pt 2, p. 1-9. 1999.

In order to further improve performance in terms of thermal insulation, a thermally insulating layer 3 may be placed on an internal surface of at least one of the glass sheets 5.

The two glass sheets 5 are assembled and made gas-tight (ensuring the vacuum) via a peripheral impermeable seal 1 placed on the periphery of the glass sheets 5 around the internal space 4, shutting the first cavity 41. Thus, the peripheral impermeable seal 1 sealably closes (with respect to the gases present outside the internal space) the internal space.

The impermeable seal 1 is a metal seal 1 securely fastened to the first and second glass sheets 5, respectively.

Figure 2:
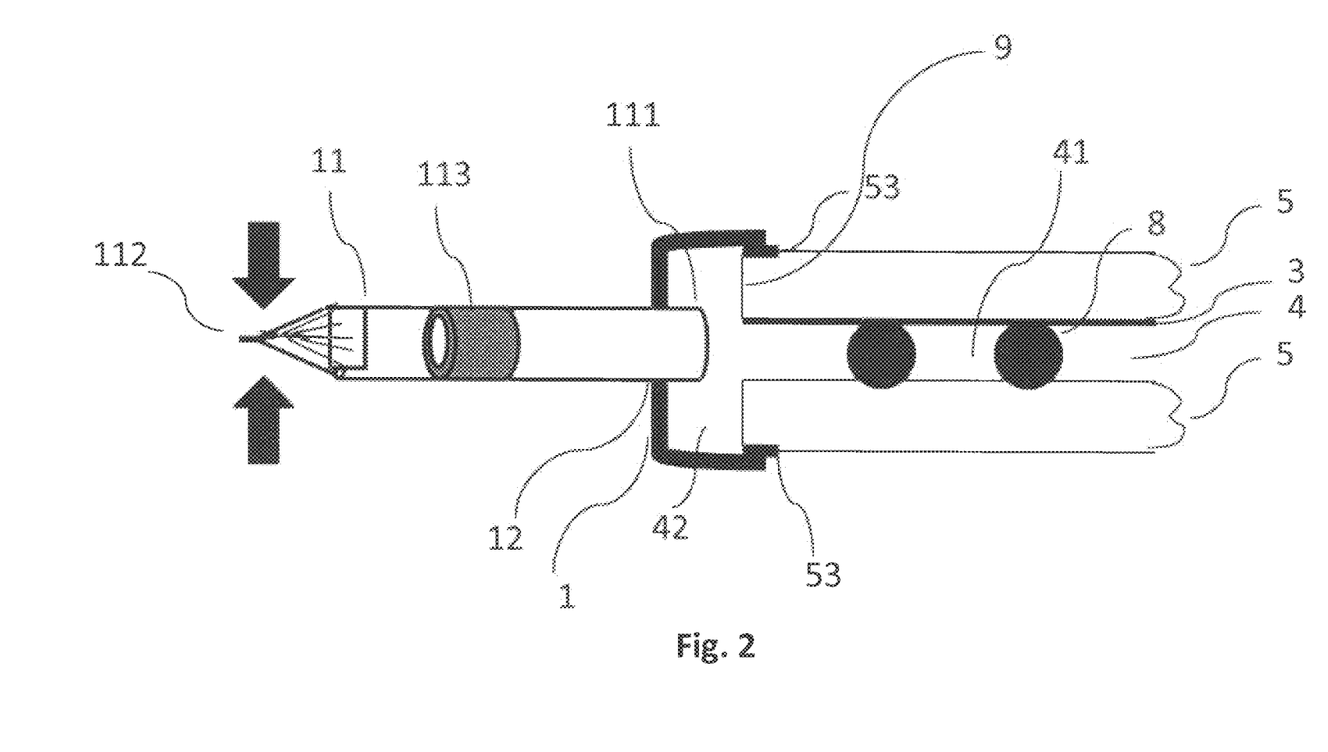
FIG. 2 shows a peripheral impermeable seal of the panel in FIG. 1 according to one embodiment of the invention.

FIG. 2 shows a peripheral impermeable seal 1 of the panel in FIG. 1 according to one embodiment of the invention. FIG. 2 shows only one portion of the cross section of the glazing panel.

For example, the metal seal 1 is securely fastened by soldering (for example by means of a solder based on tin and lead) to a first peripheral zone of the first glass sheet 5 covered with a first adhesion coating 53 and to a second peripheral zone of the second glass sheet 5 covered with a second adhesion coating 53.

The metal seal 1 comprises means 11 for bringing the internal space 4 into communication with the exterior of the panel, the means 11 of communication being blockable. For example, the means of communication comprise a hollow metal tube 11 (the outside diameter of which is for example 4 mm and the inside diameter of which is for example 2 mm) a first end 111 of which communicates with the internal space 4 and a second end 112 of which communicates with the exterior of the panel, the second end comprising means for blocking the tube. Of course, according to one variant of the invention, the means of communication comprise a plurality of such hollow metal tubes (for example two tubes, thereby possibly for example facilitating the pumping of the panel and the implementation of the optional degassing of the surfaces of the internal space of the panel).

For example, the metal seal 1 comprises a copper strip in an unoxidized state. The metal strip is drilled with a hole 12 in which the metal tube 11 is placed. The metal tube 11 is securely fastened to the metal strip by soldering (for example by means of a solder based on tin and lead). For example, the metal tube is made of copper. Of course, it may be made of any other metal or metal alloy, for example of nickel (or one of its alloys), of aluminum (or one of its alloys), etc.

Advantageously, the metal tube 11 is made of oxygen-free high-conductivity (OFHC) grade copper, also referred to as Cu-c2 or even Cu-OFE, and must have undergone an anneal between 650 and 850° C. for 30 minutes under a dry hydrogen atmosphere. Specifically, this treatment is advantageous since the material will undergo a deformation of about 350% during the pinching off. Another type of material that may be used to produce the tube 11 is high-purity nickel, for example Nickel A, NI270, NI200 or even 99.4% nickel according to standard ASTM-B161, for example, the tube 11 may have undergone an anneal at 1150° C. for 30 minutes before being pinched off. Lastly, other materials such as aluminum, pure iron, gold, platinum, silver or even niobium may also be suitable for producing the tube 11.

Advantageously, the metal tube 11 (the outside diameter of which is for example 4 mm and the internal diameter of which is for example 2 mm) comprises a getter 113 securely fastened to the interior of the tube 11.

For example, the getter 113 comprises a tubular part 113 provided to be inserted into the tube. The tubular part 113 may be securely fastened to the tube by adhesive bonding, by soldering or even by force fitting (the outside diameter of the tubular part being chosen depending on the inside diameter of the tube 11 and the fastening technique used).

For example, the getter is a cylindrical product sold by SAES Getter referenced under the name St2002 Pills with a height of 4 mm and an outside diameter of 2 mm in order to be inserted forcefully into the metal tube 11. Thus, the getter 113 consists of an alloy of zirconium, vanadium and iron and is extremely active in the adsorption of all the atmospheric gases, of oxygen and nitrogen and even water vapor, methane, carbon-containing compounds and hydrogen. The optimal activation conditions of this getter are 350° C. for 15 min.

The internal space 4 of the panel also comprises a second cavity 42 placed between the metal seal 1 and the edge face 9 of the panel, the second cavity 42 being closed by the metal seal 1. The first end of the metal tube is contained in the second cavity 4.

For example, the means for blocking the tube 11 comprise a plug formed by pinching off the second end 112 of the tube (of course, according to the invention, any other blocking technique or any other type of plug may be used, for example a metal plug that is screwed, force fitted or soldered to the second end of the tube 112). To pinch off the second end 112 of the tube 11 a pinch-off tool exerting a high pressure on the second end of the tube 11 may for example be used, for example a pinch-off tool sold under the reference "Pinch-Off Tool Manual Series (or GST Series or HAC Series)" by C. H. Bull Co., or a pinch-off tool sold under the reference "HY-187 (or HY-250 or HY-500 or even HY-750, depending on the diameter of the tube 11) Pinch-Off Tool" by Custom Products & Services.

Thus, those internal surface portions of the tube 11 which are brought into physical contact by the pinching off bond together atomically, this bonding occurring between atoms in their surface layers, thus producing a cold weld that is very strong and that does not require heat and solder to be used.

The fact that the copper of the tube is in an unoxidized state implies that the internal surface portions of the tube that are brought into physical contact by the pinching off generate more atomic bonds (relative to an oxidized state of the copper), thereby increasing the strength of the cold weld.

For example, the internal surface of the tube is cleaned beforehand (for example ultrasonically) in order to remove contaminants from the surface (which would prevent bonds from being created and therefore decrease the strength of the weld). For example, the internal surface is polished with a 320-grit emery cloth in order to remove possible oxide crystals. The external surface of the tube may also be polished with a 320-grit emery cloth in order to remove possible oxide crystals and thus ensure the aforementioned pinching off works properly.

For example, after the tube 11 has been closed by pinching off the second end 112 of the tube 11, the second end 112 of the tube 11 and the external surface of the tube located on the exterior of the panel may be covered with a protective coating, for example a metal alloy. The second end 112 of the tube 11 may also be protected by means of a plastic cap.

Moreover, the adhesion material forming the adhesion coatings 53 may be selected, for example, from the group composed of copper and its alloys (for example with titanium and/or chromium), aluminum and its alloys, iron and its alloys (such as austenitic Fe—Ni steels: e.g. iron (50-55% by weight, for example 52% by weight), nickel (45-50% by weight, for example 48% by weight), such as alloy 48), the iron alloys comprising the following metals: iron (53-55% by weight, for example 53.5% by weight), nickel (28-30% by weight, for example 29% by weight) and cobalt (16-18% by weight, for example 17% by weight), and Kovar®, platinum and its alloys, nickel and its alloys, gold and its alloys, silver and its alloys, gallium arsenide and tin or its alloys. This list not being exhaustive.

Of course, the impermeable metal seal 1 may take any other form, it may for example take the form of steps such as described in patent application WO 2011/061208 A1.

Moreover, it may, for example, be produced by virtue of a solder joint between two metal seal portions, themselves soldered to the glass sheets. Moreover, any other technique for securely fastening the impermeable seal to the void(s) may be used without departing from the scope of the invention, for example a weld obtained by directly welding glass to glass (no adhesion coating 53 is required in this case) or by force fitting.

Of course, according to variants (not illustrated) of the aforementioned embodiment, the glazing panel may furthermore comprise a third glass sheet separated from either one of the first and second glass sheets (for example from the second glass sheet) by a second space in order to form a second cavity.

According to a first variant, a second impermeable seal is furthermore placed on the periphery of the third and second glass sheets in order to form a second (16 mm thick, for example) internal space, said second internal space being filled with at least one gas. The gas may for example be air, argon, nitrogen, krypton, xenon, SF6, $CO_2$, or any other thermally insulating gas.

According to a second variant, the third and second glass sheets are assembled and made gas-tight (ensuring the vacuum) via an impermeable seal placed on the periphery of the glass sheets, shutting a second internal space, and a plurality of spacers are sandwiched between the third and second glass sheet so as to maintain the second internal space between these glass sheets. Thus a vacuum-insulated triple glazing unit is obtained.

Of course, other variants are envisionable and in particular a glass sheet may be replaced by a laminated glass panel and any other addition or modification may be made.

Figure 3:
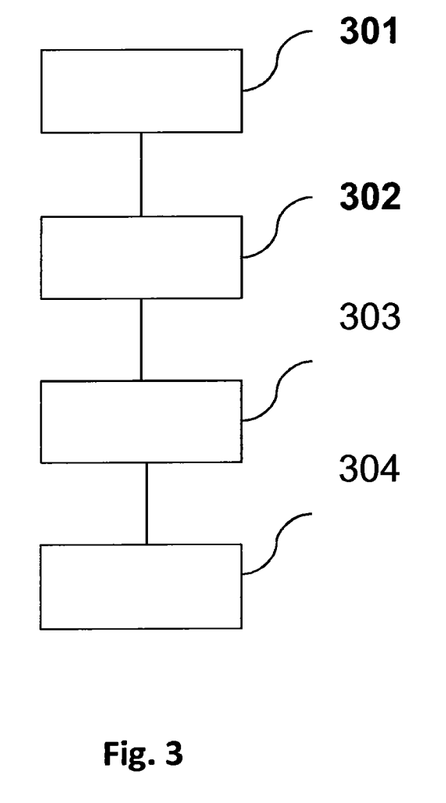
FIG. 3 illustrates a process for manufacturing a glazing panel according to one embodiment of the invention.

FIG. 3 shows a process for manufacturing the vacuum-insulated glazing panel in FIG. 1 according to one embodiment of the invention.

The manufacturing process comprises the following steps:
- associating 301 together the first and second glass sheets 5 by way of at least one spacer 8;
- closing 302 the internal space 4 (between said glass sheets 5) with the peripheral impermeable metal seal 1 (comprising the metal strip and the hollow metal tube 11, a first end (111) of which communicates with the internal space and a second end (112) of which communicates with the exterior of the panel) placed on the periphery of the glass sheets 5, around said internal space 4;
- securely fastening the getter 113 to the interior of the tube 11 by coating at least one portion of the internal surface of the tube with the getter (in the case of a getter taking the form of a coating) or by securely fastening (for example by adhesive bonding or by force fitting) the getter 113 into the tube (for example in the case of a getter 113 taking the form of a tubular part provided to be inserted into the tube);
- pumping down 303 the internal space 4 in order to obtain a vacuum with a pressure of less than 100 mbar, for example of less than 1 mbar, for example $10^{-3}$ mbar; and
- blocking 304 the second end 112 of the tube 11 once the pumping step has terminated, the blockage being obtained by pinching off the second end 112 of the tube 11.

According to the invention, the closing step 302 comprises the following step:
- securely fastening, by soldering, the metal seal to the first peripheral zone of the first glass sheet covered with a first adhesion coating 53 and to a second peripheral zone of the second glass sheet covered with a second adhesion coating.

The process also comprises a step of drilling the strip in order to produce the hole 12, a step of inserting the metal tube 11 into the hole 12 and, preferably, a step of securely fastening the metal tube to the metal strip by soldering.

Of course, the invention is not limited to the aforementioned example embodiments.

The invention claimed is:

1. A glazing panel comprising:
    a first glass sheet and a second glass sheet that are associated together by way of at least one spacer that holds said sheets a certain distance apart, and, between said glass sheets, an internal space comprising at least one first cavity, in which space there is a vacuum with a pressure of less than 100 mbar, said space being closed with a peripheral impermeable seal placed on a periphery of the glass sheets around said internal space, the impermeable seal being a metal seal securely fastened to the first and second glass sheets, respectively,
    wherein the metal seal furthermore comprises at least one hollow metal tube, a first end of which communicates with the internal space and a second end of which comprises a plug formed by pinching off the second end of the tube to form a cold weld,
    and in that the tube comprises at least one getter securely fastened to the interior of the tube.

2. The glazing panel as claimed in claim 1, wherein the getter comprises a coating placed on at least one portion of the internal surface of the tube.

3. The glazing panel as claimed in claim 1, wherein the getter comprises a tubular part provided to be inserted into the tube.

4. The glazing panel as claimed in claim 1, wherein the getter comprises an alloy of the following materials:
    zirconium;
    vanadium; and
    iron.

5. The glazing panel as claimed in claim 1, wherein the metal tube comprises at least one material selected from copper and its alloys, aluminum and its alloys and nickel and its alloys, in an unoxidized state.

6. The glazing panel as claimed in claim 1, wherein the metal seal is securely fastened by soldering to a first peripheral zone of the first glass sheet covered with a first adhesion coating and to a second peripheral zone of the second glass sheet covered with a second adhesion coating.

7. The glazing panel as claimed in claim 2, wherein the metal seal comprises a metal strip drilled with a hole into which the metal tube is placed.

8. A process for manufacturing the vacuum-insulated glazing panel as claimed in claim 1, comprising:
    associating together the first glass sheet and the second glass sheet by way of the at least one spacer that holds said sheets a certain distance apart, between said glass sheets,
    closing the internal space with the peripheral impermeable seal placed on the periphery of the glass sheets, around said internal space; and
    pumping down the internal space in order to obtain a vacuum with a pressure of less than 100 mbar,
    securely fastening the at least one getter to the interior of the tube; and
    blocking the second end of the tube by pinching off the end of the tube to form the cold weld once the pumping step has terminated.

9. The process as claimed in claim 8, further comprising coating at least one portion of the internal surface of the tube with the getter.

10. The process as claimed in claim 8, further comprising inserting the getter into the tube.

11. The process as claimed in claim 8, wherein the metal seal is securely fastened by soldering to a first peripheral zone of the first glass sheet covered with a first adhesion coating and to a second peripheral zone of the second glass sheet covered with a second adhesion coating.

12. The process as claimed in claim 8, wherein the metal seal comprises a metal strip, and
    the process further comprising
    drilling the strip in order to produce a hole, and
    inserting the metal tube into the hole.

13. A glazing panel comprising:
    a first glass sheet;
    a second glass sheet;

at least one spacer that holds said first and second glass sheets apart;

an internal space between said glass sheets, said space having a vacuum with a pressure of less than 100 mbar; and an impermeable metal seal placed on a periphery of the glass sheets enclosing said internal space, the impermeable metal seal being fastened to the first and second glass sheets, wherein the metal seal further comprises at least one hollow metal tube having first and second ends, a first end of said tube communicating with the internal space and the second end of the tube comprising a plug formed by pinching off the second end of the tube to form a cold weld, and wherein the tube comprises at least one getter.

14. The glazing panel as claimed in claim 13, wherein the getter comprises a coating placed on at least one portion of an internal surface of the tube.

15. The glazing panel as claimed in claim 13, wherein the getter comprises a tubular part provided to be inserted into the tube.

16. The glazing panel as claimed in claim 13, wherein the getter comprises an alloy of a material selected from the group consisting of zirconium, vanadium, and iron.

17. The glazing panel as claimed in claim 13, wherein the metal tube comprises at least one material selected from the group consisting of copper and its alloys, aluminum and its alloys, and nickel and its alloys, in an unoxidized state.

18. The glazing panel as claimed in claim 13, wherein the metal seal is fastened by soldering to a first peripheral zone of the first glass sheet covered with a first adhesion coating and to a second peripheral zone of the second glass sheet covered with a second adhesion coating.

19. The glazing panel as claimed in claim 13, wherein the metal seal comprises a metal strip having a hole into which the metal tube is placed.

* * * * *